(12) United States Patent
Supina

(10) Patent No.: US 9,108,505 B2
(45) Date of Patent: Aug. 18, 2015

(54) POWERSPLIT POWERTRAIN FOR A HYBRID ELECTRIC VEHICLE

(71) Applicant: FORD GLOBAL TECHNOLOGIES, LLC, Dearborn, MI (US)

(72) Inventor: Joseph G. Supina, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 32 days.

(21) Appl. No.: 13/903,105

(22) Filed: May 28, 2013

(65) Prior Publication Data

US 2014/0357441 A1    Dec. 4, 2014

(51) Int. Cl.

| | |
|---|---|
| F16D 25/08 | (2006.01) |
| B60K 6/547 | (2007.10) |
| B60K 6/365 | (2007.10) |
| B60K 6/387 | (2007.10) |
| B60K 6/445 | (2007.10) |
| B60K 6/38 | (2007.10) |

(52) U.S. Cl.
CPC ............... *B60K 6/547* (2013.01); *B60K 6/365* (2013.01); *B60K 6/387* (2013.01); *B60K 6/445* (2013.01); *B60K 2006/381* (2013.01); *Y02T 10/6239* (2013.01); *Y02T 90/14* (2013.01); *Y10S 903/902* (2013.01)

(58) Field of Classification Search
CPC ........ B60K 6/547; B60K 6/365; B60K 6/445; B60K 6/387; B60K 6/50; B60K 2006/381
USPC .......................................................... 475/5
See application file for complete search history.

(56) References Cited

U.S. PATENT DOCUMENTS

| | | | |
|---|---|---|---|
| 7,694,762 B2 | 4/2010 | Supina et al. | |
| 8,425,359 B1 * | 4/2013 | Holmes et al. | 475/5 |
| 8,475,311 B2 * | 7/2013 | Ren et al. | 475/5 |
| 8,485,290 B2 * | 7/2013 | Abe et al. | 475/5 |
| 8,500,589 B2 * | 8/2013 | Ortmann et al. | 475/152 |
| 8,535,188 B2 * | 9/2013 | Tangl | 475/5 |
| 8,591,361 B2 * | 11/2013 | Hisada et al. | 475/5 |
| 2002/0002094 A1 | 1/2002 | Kmicikiewicz | |
| 2003/0166429 A1 * | 9/2003 | Tumback | 475/5 |
| 2004/0166980 A1 * | 8/2004 | Supina et al. | 475/5 |
| 2004/0176203 A1 * | 9/2004 | Supina et al. | 475/8 |
| 2004/0211604 A1 * | 10/2004 | Heitmann et al. | 180/65.2 |
| 2007/0275808 A1 * | 11/2007 | Iwanaka et al. | 475/5 |

(Continued)

FOREIGN PATENT DOCUMENTS

DE    102006009296 A1    6/2007

OTHER PUBLICATIONS

Fazal U. Syed, et al., Derivation and Experimental Validation of a Power-Split Hybrid Electric Vehicle Model, IEEE Transactions on Vehicular Technology, vol. 55, No. 6, Nov. 2006, pp. 1731-1747.

*Primary Examiner* — David J Hlavka
(74) *Attorney, Agent, or Firm* — David B. Kelley; MacMillan, Sobanski & Todd, LLC

(57) ABSTRACT

A powertrain includes a planetary gearset including an input connected to a shaft driveably connected to an engine, a second input driveably connected to an electric machine, and an output driveably connected to a countershaft, a clutch for releaseably connecting the countershaft and the input shaft through a first pair of meshing gears, and a brake for releaseably holding the input shaft and the input against rotation.

20 Claims, 2 Drawing Sheets

(56) References Cited

U.S. PATENT DOCUMENTS

| | | |
|---|---|---|
| 2009/0275439 A1 | 11/2009 | Kersting |
| 2010/0216584 A1* | 8/2010 | Lutoslawski ................ 475/5 |
| 2012/0028747 A1* | 2/2012 | Imamura et al. ............. 475/5 |
| 2013/0035186 A1 | 2/2013 | Martin et al. |
| 2013/0260936 A1* | 10/2013 | Takei et al. ................. 475/5 |

* cited by examiner

POWERSPLIT POWERTRAIN FOR A HYBRID ELECTRIC VEHICLE

BACKGROUND OF THE INVENTION

1. Field of the Invention

This invention relates generally to a powersplit powertrain for a hybrid electric vehicle.

2. Description of the Prior Art

The powertrain of a hybrid electric vehicle (HEV) includes an engine, at least one electric machine which can act as a motor/generator and traction battery, wherein the engine and an electric machine can drive the wheels individually, the engine can charge the traction battery through an electric machine operating as a generator, and vehicle kinetic energy can be recovered and regenerated during deceleration by powering an electric machine to act as a generator to recharge the battery.

A powersplit powertrain provides excellent fuel economy during city driving, but incurs a penalty during highway driving due to negative split operation. Grounding the generator using a clutch does not produce the best speed ratio for the engine under normal highway driving conditions.

A powersplit powertrain does not have a dedicated reverse gear, but rather produces reverse operation using the electric motor only to provide torque. Due to this operation, the reverse launch capability is directly related to the peak motor torque, which is usually less than a conventional vehicle. The peak motor torque is thus a key design parameter for the powersplit hybrid system.

Using a generator brake, it is possible to engage the generator brake during highway speed, thereby eliminating the transmission losses incurred during negative split operation. However, due to the gear ratios, this typically establishes an engine speed that is too high for optimal fuel consumption. The use of a generator brake in practice is limited to a small operating region.

A powersplit powertrain that includes a one-way clutch on the engine input shaft allows the generator to contribute torque to improve the peak output torque during a forward launch. However, this has been found to cause a large "torque hole" decrease in output shaft torque when the engine is started. In addition, the one-way clutch can not be used to aid in reverse launch because the torque direction does not cause the clutch to engage.

SUMMARY OF THE INVENTION

A powertrain includes a planetary gearset, an input connected to a shaft driveably connected to an engine, a second input driveably connected to an electric machine, and an output driveably connected to a countershaft, a clutch for releaseably connecting the countershaft and the shaft through a first pair of meshing gears, and a brake for releaseably holding the shaft and the input against rotation.

By adding a separate fixed ratio for highway driving, the ratio can be designed to maximize highway fuel economy. Also, the peak motor torque requirement for the system is reduced since the generator can contribute torque during vehicle launch.

The low speed launch torque of the powertrain is improved with the clutch engaged, because both electric machines can be used to launch the vehicle, with the engine spinning but not producing torque. This reduces the peak motor torque requirement of the motor, and reduces the "torque hole" that is present with a one-way clutch.

The brake holds the engine input shaft locked at zero speed, allowing both of the electric machines to contribute to both forward and reverse driving torque and launch. In a PHEV vehicle, this mode could be engaged during the entire charge depleting operation, since the torque and power of both electric machines can be combined to provide propulsion.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
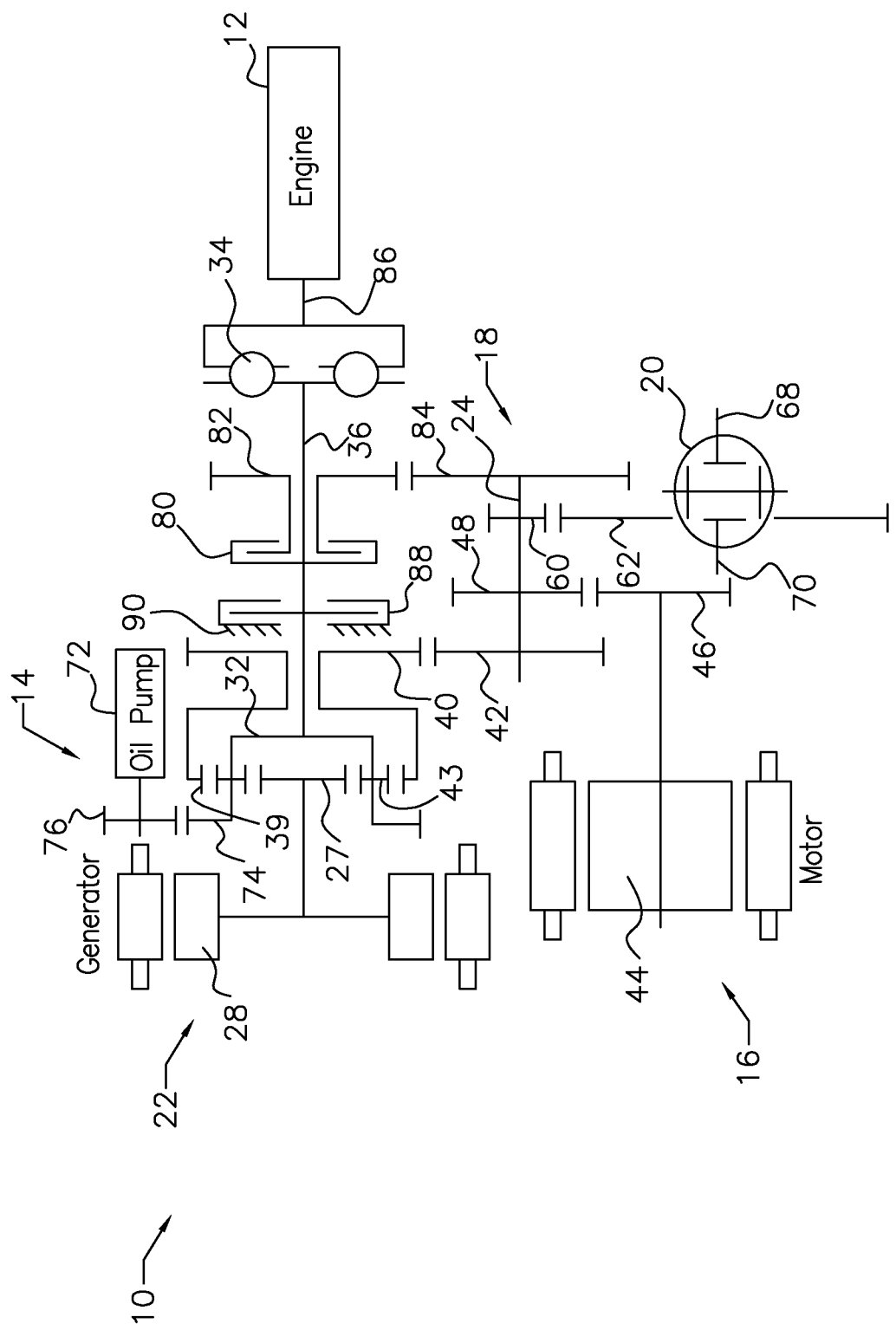
FIG. 1 is a schematic diagram of a HEV powertrain.

Referring first to FIG. 1, a HEV powertrain 10 includes a power source such as an internal combustion engine 12, such as a diesel engine or gasoline engine; a planetary gearset 14; a first electric machine 16, commonly called the motor; layshaft gearing 18; a differential mechanism 20; a second electric machine 22, commonly called the generator; and a countershaft 24, which is driveably connected to differential mechanism 20.

Each electric machine 16, 22 is a motor-generator, and can operate either as a motor or as a generator as desired, although conventionally electric machine 16 is sometimes referred to as the motor or traction motor, and electric machine 22 is sometimes referred to as the generator.

The sun gear 27 of the planetary gearset 14 is secured to the rotor 28, of electric machine 22 (the generator). The carrier 32 of the planetary gearset 14 is connected to the engine 12 through a torsion damper 34 and shaft 36. The ring gear 39 of gearset 14 is driveably connected to countershaft 24 through gear 40 and gear 42, which are mutually engaged and form a layshaft gear pair 40-42. Planet gears 43, supported on carrier 32, are in continual meshing engagement with ring gear 39 and sun gear 27.

The rotor 44 of electric machine 16 (the motor) is connected to countershaft 24 through the gear pair 46-48.

Countershaft 24 is connected through gear 60 and gear 62 to the differential mechanism 20, which transmits power to the vehicle wheels through halfshafts or axle shafts 68, 70.

An oil pump 72 is driveably connected to shaft 36 and the engine output by gear 74 and gear 76.

The powertrain 10 provides improved highway fuel economy by allowing a specific ratio between engine speed and output shaft speed when a fixed gear mode is activated. This is accomplished by a friction clutch 80, which is secured to shaft 36; gear 82; and gear 84, which is secured to countershaft 24 and meshes continually with gear 82 forming a gear-pair 82-84. Clutch 80 is engaged to produce a fixed speed ratio between the engine crankshaft 86 and countershaft 24.

Powertrain 10 also includes a friction brake 88, which can hold the engine crankshaft 86 at zero speed by grounding it to a case 90. When brake 88 is engaged, it provides increased reverse launch torque through planetary gearset 14 by holding carrier 32 against rotation while the electric machine 22 (the generator) drives sun gear 27 and the output ring gear 39 rotates in a reverse direction relative to rotor 28.

Figure 2:
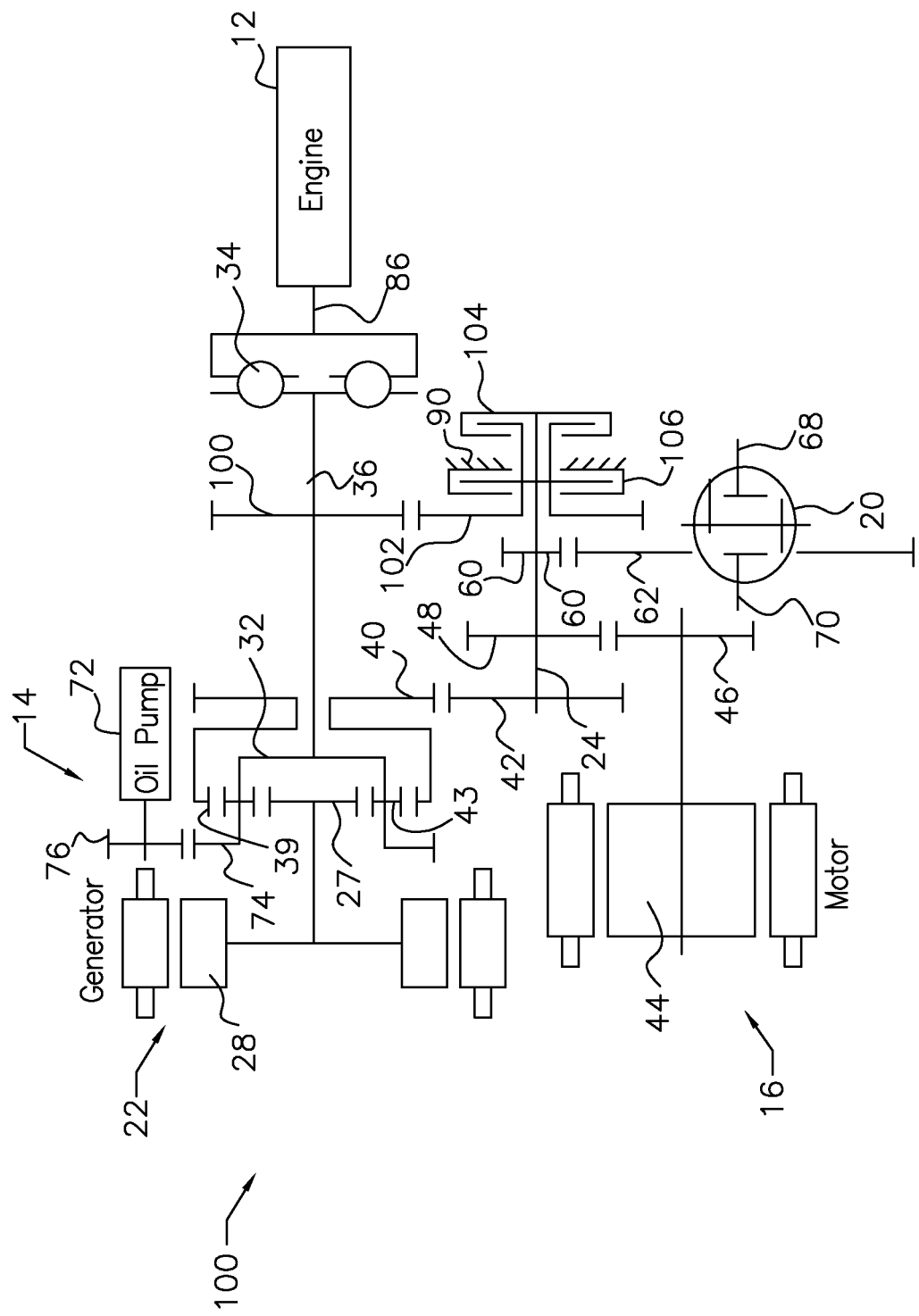
FIG. 2 is a schematic diagram of an alternate implementation of the HEV powertrain shown in FIG. 1.

FIG. 2 shows the components of powertrain 10 rearranged such that a clutch 80 and brake 88 are removed. A gear 100 is secured to shaft 36. Gear 102, which meshes with gear 100, is journalled on countershaft 24. Clutch 104 and brake 106 are journalled on crankshaft 24. Clutch 104 is engaged to produce a fixed speed ratio, produced by gear-pair 100-102 between the engine crankshaft 86 and countershaft 24. When brake 106 is engaged, it provides reverse launch torque through planetary gearset 14 by holding carrier 32 against rotation while the electric machine 22 (the generator) drives sun gear 27 and the output ring gear 39 rotates in a reverse direction relative to rotor 28.

Clutches 80, 104 and brakes 88, 106 can be hydraulically-actuated slip-plate friction devices, synchronizers, dog clutches or any other known method of implementing a clutch.

In operation with clutch 80, 104 and brake 88, 106 disengaged or open, powertrain 10 operates as a standard power-split transmission, which provides excellent fuel economy during city driving.

The powertrain 10 operates under highway driving conditions preferably with clutch 80, 104 engaged or closed and brake 88, 106 open. Engine speed is directly linked to the output shaft speed. Typically, the ratio between engine speed and output shaft speed will be chosen to optimize the highway fuel economy. In this highway operating mode, electric machine 16 (the motor) can provide extra torque to assist with accelerations and short grade climbs without disengaging the clutch 80, 104.

In this highway operating mode, the speed relationship in the planetary gearset 14 is fixed, so electric machine 22 (the generator) will be spinning at a fixed multiple of the output shaft speed. The electric machine 22 (the generator) can contribute torque and power to propel the vehicle. Propulsion can be provided by the electric machine 22 (the generator), electric machine 16 (the motor) and engine 12 concurrently if there is sufficient battery power.

The low speed launch torque of the powertrain 10 is improved by launching with clutch 80, 104 engaged, and using both electric machine 22 (the generator) and electric machine 16 (the motor) to launch the vehicle, with the engine 12 spinning but not producing torque. This reduces the peak motor torque requirement of the motor, and reduces the "torque hole" which is present when using dual motor launch with a one-way clutch on the input shaft.

Alternatively, vehicle launch operation can be improved by disengaging clutch 80, 104 and engaging brake 88, 106. With the clutch open and brake closed, engine speed is zero and torque produced by electric machine 22 (the generator) is transmitted to the countershaft 24 with a large ratio. This can be used to improve both the forward launch and the reverse launch capability of the powertrain 10.

In addition to launch, operating a plug-in HEV in charge depleting mode with the brake closed allows the torque and power of electric machine 22 (the generator) to be combined with those of the electric machine 16 (the motor) to provide a higher power level at the wheels. This allows use of a smaller electric machine 16 (the motor) without compromising PHEV electric drive capability. For example, a 70 kW electric machine 16 (motor) plus a 50 kW electric machine 22 (generator) would provide 120 kW of output capability. In order to provide the same level of output power without the brake, electric machine 16 (the motor) would need to be able to provide the full 120 kW of capability.

Clutch 80 and brake 90 can be implemented in combination as shown in FIGS. 1 and 2, or separately, i.e., with clutch 80 implemented and brake 90 absent, or with brake 90 implemented and clutch 80 absent from either powertrain configuration 10 or 100.

In accordance with the provisions of the patent statutes, the preferred embodiment has been described. However, it should be noted that the alternate embodiments can be practiced otherwise than as specifically illustrated and described.

The invention claimed is:

1. A powertrain, comprising:
    a planetary gearset including an input connected to a shaft driveably connected to an engine, a second input driveably connected to an electric machine, and an output driveably connected to a countershaft;
    a clutch for releaseably connecting the countershaft and the shaft, bypassing the planetary gearset during clutch engagement, through a first gear pair;
    a brake for releaseably holding the shaft and the input against rotation.

2. The powertrain of claim 1, further comprising a second electric machine connected to the countershaft through a second gear pair.

3. The powertrain of claim 2, further comprising a third gear pair through which the output is connected to the countershaft.

4. The powertrain of claim 3, further comprising a fourth gear pair through which the countershaft is connected to a differential.

5. The powertrain of claim 1, wherein the second input is always rotationally fixed to the electric machine.

6. The powertrain of claim 1, the shaft connects the input to the engine through a torsion damper, the shaft supporting the clutch and the brake thereon.

7. The powertrain of claim 1, wherein the planetary gearset includes:
    a carrier comprising the input;
    a sun gear comprising the second input;
    a ring gear comprising the output; and
    planetary gears supported for rotation on the carrier and meshing with the sun gear and the ring gear.

8. A powertrain, comprising:
    a planetary gearset including an input always rotationally fixed to an engine, a second input always rotationally fixed to an electric machine, and an output connected to a countershaft;
    a first gear pair including a first member always rotationally fixed to the input and a second member always rotationally fixed on the countershaft;
    a clutch releaseably connecting the countershaft and the input through the first gear pair.

9. The powertrain of claim 8, further comprising a second electric machine connected to the countershaft through a second gear pair.

10. The powertrain of claim 9, further comprising a third gear pair through which the countershaft is connected to a differential.

11. The powertrain of claim 10, further comprising a fourth gear pair through which the countershaft is connected to the output.

12. The powertrain of claim 8, wherein engagement of the clutch connects the countershaft to the input, bypassing the planetary gearset.

13. The powertrain of claim 8, further comprising a shaft that connects the input and the first member to the engine through a torsion damper.

14. The powertrain of claim 8, further comprising a brake for releaseably holding the first gear pair against rotation.

15. A powertrain, comprising:
   a planetary gearset including a sun gear connected an electric machine, a carrier always rotationally fixed to an engine, a ring gear connected to a countershaft, planetary gears meshing with the sun gear and ring gear;
   a clutch for releaseably connecting the countershaft and the carrier, bypassing the planetary gearset during clutch engagement, through a first gear pair;
   a second electric machine connected to the countershaft through a second gear pair.

16. The powertrain of claim 15, further comprising a third gear pair through which the ring gear is connected to the countershaft.

17. The powertrain of claim 16, further comprising a fourth gear pair through which the countershaft is connected to a differential.

18. The powertrain of claim 15, further comprising a shaft that connects the carrier and the clutch to the engine through a torsion damper.

19. The powertrain of claim 15 further comprising a brake, mounted on the countershaft, for releasably holding the carrier against rotation.

20. The powertrain of claim 15 further comprising a shaft that connects the carrier and the clutch, and a brake, mounted on the shaft, for releasably holding the carrier against rotation.

* * * * *